(12) United States Patent
Beale

(10) Patent No.: US 6,630,952 B1
(45) Date of Patent: Oct. 7, 2003

(54) OPTICAL DETECTION SYSTEM

(75) Inventor: Marc I J Beale, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/230,688

(22) PCT Filed: Jul. 30, 1997

(86) PCT No.: PCT/GB97/02049
§ 371 (c)(1),
(2), (4) Date: Jan. 29, 1999

(87) PCT Pub. No.: WO98/05990
PCT Pub. Date: Feb. 12, 1998

(30) Foreign Application Priority Data

Aug. 3, 1996 (GB) .............................................. 9616390

(51) Int. Cl.⁷ ............................................... H04N 5/225
(52) U.S. Cl. ..................... 348/218.1; 348/335; 348/143
(58) Field of Search .............................. 348/218.1, 335, 348/344, 340, 342, 143, 39

(56) References Cited

U.S. PATENT DOCUMENTS

| | | | | |
|---|---|---|---|---|
| 3,388,650 A | * | 6/1968 | Westphalen | ................. 359/675 |
| 4,383,170 A | * | 5/1983 | Takagi et al. | ................. 250/216 |
| 4,443,067 A | * | 4/1984 | Owen et al. | ................. 359/675 |
| 4,516,032 A | * | 5/1985 | Barr | ......................... 250/208.1 |
| 4,589,030 A | * | 5/1986 | Kley | ............................ 348/367 |
| 4,650,988 A | * | 3/1987 | Suzuki et al. | ................ 250/216 |
| 4,928,174 A | * | 5/1990 | Smith | ........................... 348/143 |
| 5,126,554 A | * | 6/1992 | Ranson | ........................ 250/216 |
| 5,696,371 A | * | 12/1997 | Meyers | ..................... 250/208.1 |
| 6,005,721 A | * | 12/1999 | Baumann et al. | ............. 359/639 |

FOREIGN PATENT DOCUMENTS

| | | |
|---|---|---|
| EP | 0 029 568 A | 6/1981 |
| EP | 0 656 724 A | 6/1995 |
| GB | 2 090 100 A | 6/1982 |
| WO | 93 14594 A | 7/1993 |

* cited by examiner

*Primary Examiner*—Andrew Christensen
*Assistant Examiner*—Eric Wisdahl
(74) *Attorney, Agent, or Firm*—Nixon & Vanderhye P.C.

(57) ABSTRACT

A CCTV surveillance system is provided with an optical device (60) for providing different images through different areas of the CCTV camera lens (14) controllably at different times. The different images can be used to improve the resolution of the images obtained, or to increase the field of view, by sacrificing the image refresh rate.

19 Claims, 5 Drawing Sheets

US 6,630,952 B1

OPTICAL DETECTION SYSTEM

This application is the U.S. national phase of International Application No. PCT/GB97/02049, filed Jul. 30, 1997, the entire content of which is hereby incorporated by reference.

BACKGROUND OF THE INVENTION

1. Field of the Invention

This invention relates to an optical detection system, for example for use in a surveillance system.

2. Discussion of Prior Art

Conventional surveillance systems use closed circuit television (CCTV) cameras, monitors and video recorders, which use the same standards (PAL, SECAM, NTSC, etc.) as are used in broadcast television applications. Because of the use of this well-developed technology, CCTV surveillance systems can be highly cost-effective. Acceptable frame refresh rates and image resolution can be achieved, without excessive signal bandwidth demands, at a reasonable cost.

It is desirable, however, in surveillance applications, to achieve the greatest possible image resolution, as this may be necessary, for example to be able to identify an individual under surveillance.

Conventionally, this can only be achieved using a single fixed camera by providing a zoom image, which necessarily means that the field of view of the camera is restricted, with obvious disadvantages. Therefore, alternative prior art systems include multiple fixed cameras, which obviously increase the cost and weight of the system, and mechanically driven single cameras. However, these latter systems are also considerably more expensive than using a fixed camera, while still having the disadvantage that, since they need to be relatively slow moving, parts of the required field of view are actually not under surveillance for relatively long periods of time, for example many seconds.

UK Patent Application No. GB 2 090 100 A describes an optical imaging system in which a liquid crystal spatial light modulator is used to image sub-areas of a total image with the sub-areas being transmitted one by one to a detector, thereby apparently increasing the spatial resolution. The system described therein requires a respective optical channel for each sub-area, with each channel having individual optical components to generate an image of each sub-area on the detector. The system would therefore be costly to manufacture. In addition, in order to accommodate the required optical components a periscope arrangement is required for each optical channel. Whilst such an arrangement might be achievable for a relatively low number of optical channels, for example four, it would become overly complex if the number of channels were to be increased.

European Patent Application No. EP 0 029 568 A describes an imaging system where a liquid crystal spatial light modulator is used to select a sub-area to be imaged on a detector. The system described therein incorporates a simple lens having the spatial light modulator at its image plane and a compound lens which focuses images formed at each of four spatial light modulator elements onto the detector. The spatial light modulator is positioned at the image plane of the simple lens and at the focal plane of the compound lens. In order for the described system to work, it would appear that the spatial light modulator has to include some form of light scatterer. Such an arrangement is not optically efficient since light would be scattered in directions other than those towards the compound lens.

SUMMARY OF THE INVENTION

The present invention derives from the realisation that the relatively high frame refresh rate, provided by a conventional CCTV camera so that realistic moving images of broadcast quality can be achieved, is unnecessary for most surveillance applications. In such applications, it may be acceptable to sacrifice the high frame refresh rate to achieve higher image resolution and/or a wider field of view. In accordance with preferred embodiments of the invention, this is achieved by the use of an optical device which provides multiple images sequentially to the camera.

The present invention provides an optical detection system comprising:
  (i) an image detector having an image detector area;
  (ii) a lens arrangement for focusing light from a scene onto said detector, and
  (iii) an optical device for acting upon light passing to said detector, characterized in that:
     (a) said lens arrangement comprises a lens having a single optical axis; and
     (b) said optical device comprises an array of optical elements each for acting upon light passing through a respective portion of said lens wherein said optical elements form a plurality of optical channels for the transmission of respective images to said detector through said lens; and wherein each image substantially fills the whole of the image detector area.

The system of the invention may further comprise a selective shutter device for controlling the transmission of light to said detector, said shutter device comprising an array of shutter elements and a controller for controlling said array of shutter elements, each of said shutter elements being selectively openable and closable in response to a respective control signal from said controller; and wherein said optical elements and said respective shutter elements in combination form a plurality of optical channels for the transmission of light to said detector through said lens; and wherein said shutter device provides means for selecting at least one of said optical channels for the transmission therethrough of an image to said detector.

The selective shutter device may be a spatial light modulator which in a preferred embodiment is a liquid crystal spatial light modulator. A possible alternative to a liquid crystal spatial light modulator might be a mechanical shutter. It is likely that mechanical devices would have fewer shutter elements than a liquid crystal array. Preferably, the selective shutter device is positioned adjacent the lens.

The system of the invention may be arranged to selectively detect images from a plurality of directions, with control of the selective shutter controlling the look direction. To achieve this multi-directional capability, the optical device may be an array of reflecting elements, each arranged to receive light from a particular look direction. Such devices would be particularly suitable for use in surveillance applications where it is desirable to obtain images from a variety of directions.

Alternatively, the system may be configured to have a single look direction but to detect images over a range of focal distances. Such systems have applications in situations where the direction in which an object will appear is known but the separation between the system and the object is uncertain. Conventionally, such a situation would require the use of an automatically focusing camera or a camera with a sufficient depth of focus to accommodate such uncertainties at the expense of image resolution. To achieve the variable focal range capability, the optical device of the invention may comprise an array of lenslets, each having a respective focal length.

The system of the invention may be configured to provide spectral sensitivity. This capability may be achieved by a system in which the optical device is an array of filters, each filter having a respective transmission bandwidth.

BRIEF DESCRIPTION OF THE DRAWINGS

For a better understanding of the present invention, and to show how it may be put in effect, reference will now be made, by way of example, to the accompanying drawings, in which.

DETAILED DISCUSSION OF EMBODIMENTS

Figure 1:
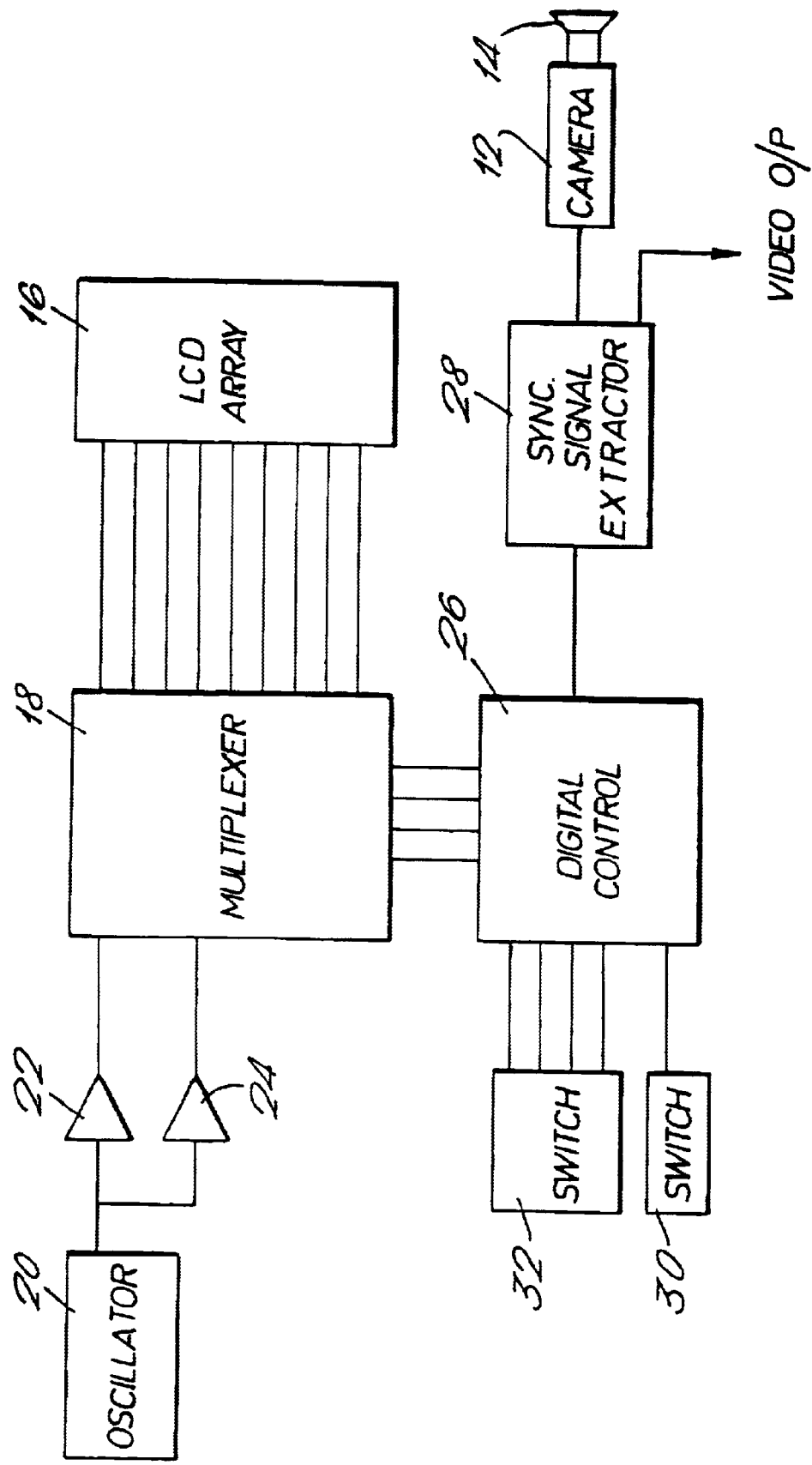
FIG. 1 is a block schematic diagram of a system in accordance with the invention.

FIG. 1 is a block schematic diagram of a system in accordance with the invention. The system includes a CCTV camera 12 and a zoom lens 14, which may be of a conventional form. The camera 12 and zoom lens 14 are positioned such that they view a scene through an optical device (not shown in FIG. 1). A liquid crystal array 16 is physically located between the camera 12 and the optical device.

In this illustrated embodiment of the invention, the liquid crystal array is a matrix of nine elements, arranged in a 3×3 square. The array is positioned such that the nine elements occupy the whole field of view of the lens 14. Signals are sent to the array 16 from a multiplexer 18, which controls which of the elements are to be opaque, and which are to be transparent An oscillator 20 provides a signal at, for example, 1 kHz through a pair of amplifiers 22, 24, which respectively provide ±20 volt and ±2 volt signals to the multiplexer 18. These signal levels are respectively those required to turn liquid crystal segments off, i.e. opaque, and on, i.e. transparent.

The multiplexer 18 is controlled by a digital control device 26, which sends output signals to the multiplexer 18, to control the signals which are sent to the liquid crystal array 16. The digital control device 26 receives signals from a sync signal extractor 28, which is connected to the camera 12. On the basis of the signals from the sync signal extractor 28, the digital control device is able to ensure that the switching of the elements in the liquid crystal array 16 remains synchronous with the video signal. Thus, different elements can be switched on or off during the blanking period at the start of each frame. The sync signal extractor 28 also provides an output video signal, which may for example be supplied to a frame grabber or video recorder.

Two switches 30, 32 are also connected to the digital control device 26. The first switch 30 determines whether the digital control device 26 is in a manual mode or an automatic mode. When switch 30 indicates that the control is in a manual mode, the switch 32 can be used to set a particular element of the liquid crystal array 16 which is to be switched permanently on. When switch 30 indicates that the control device 26 is to be in automatic mode, the switch 32 can be used to set the rate at which elements in the liquid crystal array 16 are sequentially switched on and off. For example, it might be most useful to cycle through all elements at the video frame rate, but in some situations the rate might be changed, or only some of the elements might be used, or the elements might be opened in groups to give superimposed images.

Figure 2:
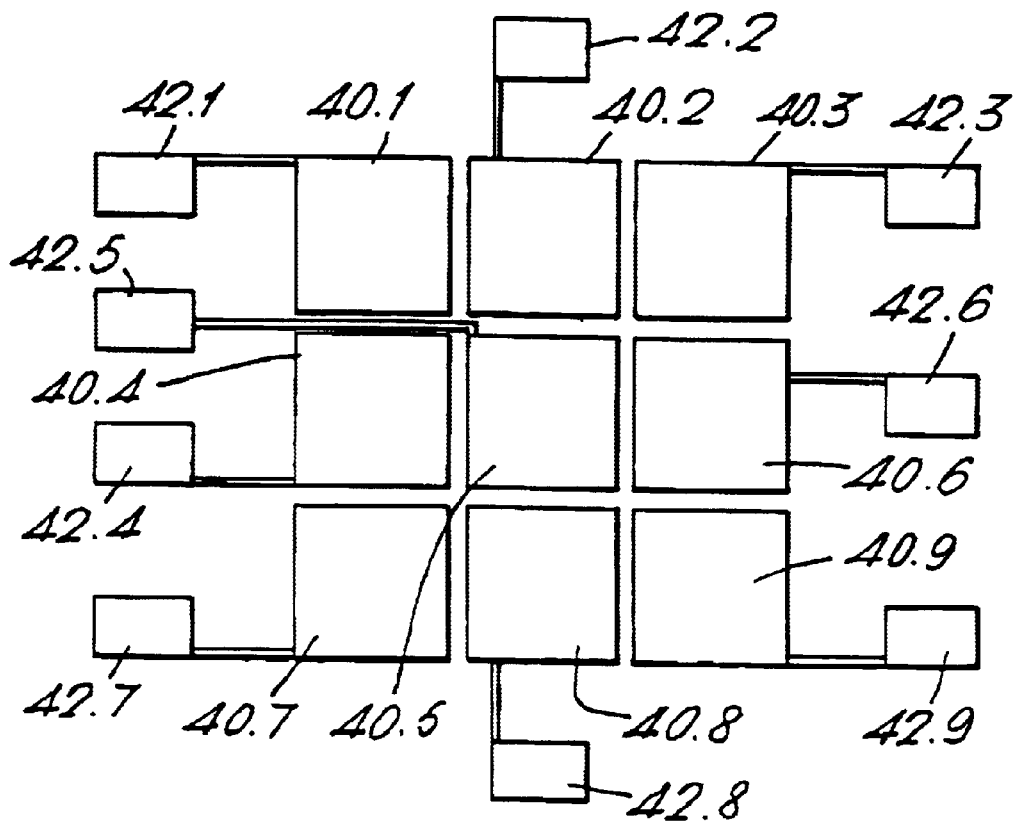
FIG. 2 is a plan view of a liquid crystal array in the system of FIG. 1.
Figure 3:
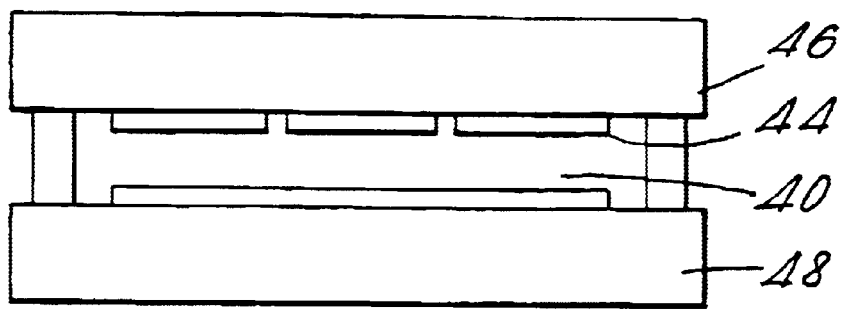
FIG. 3 is a cross-sectional view through the liquid crystal array.

FIG. 2 is a plan view of the liquid crystal array 16, and FIG. 3 is a cross-sectional view through the liquid crystal array 16. The array is made up of nine elements 40.1, 40.2, . . . 40.9, arranged in a 3×3 square. Each liquid crystal element 40.1, 40.2, . . . 40.9, is connected to a respective contact pad 42.1, 42.2, . . . 42.9, and it is to these contact pads that the control signals from the multiplexer 18 are applied to turn the elements on or off as desired.

As shown in FIG. 3, the respective liquid crystal elements 40 are in contact with a transparent conducting oxide 44, sandwiched between respective glass plates 46, 48 as is conventional in the field of liquid crystal devices.

Figure 4:
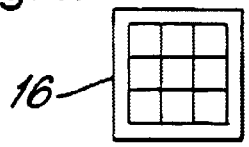
FIG. 4 is a representation of the liquid crystal array in the fully open state.
Figure 5:
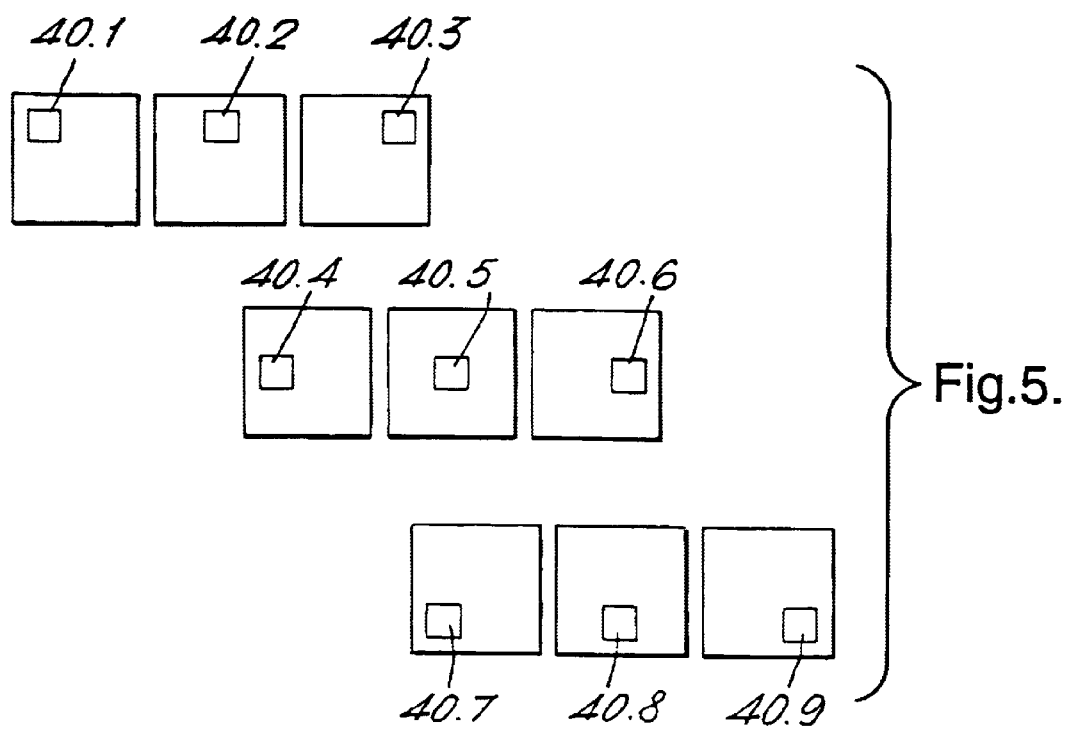
FIG. 5 is a representation showing an operational sequence of the liquid crystal array.

FIG. 4 is a representation of the liquid crystal array in the fully open state, while FIG. 5 is a representation showing a sequence in which first element 40.1 is the only open liquid crystal element, then element 40.2 is the only open element, and so on until element 40.9 is the only open element. The liquid crystal array thus acts as a controllable selective shutter.

It will be appreciated that the liquid crystal array may be replaced as the shutter by a mechanical shutter, a deformable mirror device, or another electro-optic system. It is, however, advantageous if the shutter is controllable at high speed, for example such that different areas of the shutter can be opened and closed at a rate which corresponds to video frame rates. The liquid crystal array has this advantage, and allows rapid switching to be achieved without causing vibration.

Figure 6:
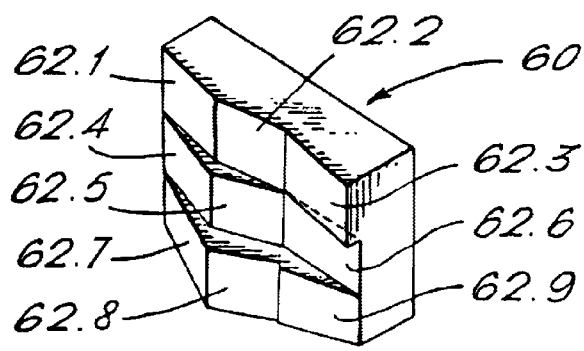
FIG. 6 shows an optical device forming part of a system in accordance with preferred embodiments of the invention.

As mentioned above, the liquid crystal array 16 is placed in front of the zoom lens 14, such that it occupies substantially the whole of its field of view. Positioned within that field of view is a further optical device, which controls the images which are sent to the zoom lens 14. FIG. 6 shows an optical device 60, which may be used to provide multiple images to the camera 12. Specifically, the optical device 60 in this case has a face which is made up of nine mirrored surfaces 62.1, 62.2, . . . 62.9, all of which are differently inclined relative to one another, and which correspond in position to the elements 40.1, 40.2, . . . 40.9 of the liquid crystal array 16. The mirrored device 60 can then be placed adjacent to the liquid crystal array 16, such that each of the surfaces 62.1, 62.2, . . . 62.9, reflects a different image through the corresponding one of the elements 40.1, 40.2, . . . 40.9. The mirrors and the shutter apertures must be aligned in accordance with normal geometric optics practice. Thus, by controlling the liquid crystal array such that only one of the elements is on, i.e. transparent, it is only the image reflected from the corresponding mirrored surface which is seen through the lens 14. To minimise "bleeding" of an image from one of the other mirrored surfaces through the open element, it is advantageous to: minimise the path length between the lens and the mirrors; provide a thin black line or dead zone between pixels in the liquid crystal array; and/or provide a thin black line or dead zone between the mirrored surfaces.

By appropriate design or adjustment of the device 60, a range of different views can be transmitted to the camera. In this illustrated embodiment, there are nine alternative views. If each liquid crystal element is addressed sequentially, at the normal video frame rate of 25 Hz, the video output signal comprises a sequence of frames made up from images reflected from the nine surfaces.

The device 60 may be replaced by any optical device which provides different images to different parts of the liquid crystal array 16. For example, instead of multiple mirrored surfaces, a group of refractive components such as prisms may be used to provide images from different directions.

Implementation of the system described above makes use of the fundamental property of a "perfect lens", namely that a full image is formed by light entering any small part of the aperture of the lens. In practice, using a real lens, there may be partial obscuration of images obtained through only part of the lens aperture. However, this effect can be reduced to zero by selecting an appropriate standard lens which has a suitably high input aperture. Although a standard lens may be used, it may be desirable to use a specially manufactured lens for this purpose. Since such a lens is only designed for imaging over small patches of its surface, it needs only to be optically corrected over each small sub-aperture, rather than over the entire lens surface. This can reduce the cost of manufacture.

In effect, the camera is receiving a sequence of signals from nine optical channels. By contrast with a conventional system, with a single fixed camera, the system in accordance with the invention can provide a different zoomed image through each of the nine channels, covering the same field of view as in the conventional system, such that, in any one channel, the image is of much higher resolution that in the prior art system. Alternatively, the mirrored surfaces of the optical device 60 may be located such that the nine channels provide a much wider field of view than can be achieved using a conventional system. This is achieved, in effect, by sacrificing the frame refresh rate. The image from each of the nine channels is updated only at ⅑ of the video rate, that is, once every 360 ms, rather than once every 40 ms. However, this is acceptable for surveillance applications, because what is required is not a high quality moving image, but a high resolution still picture, which can of course be obtained by recording the video output signal on a conventional video cassette recorder with a freeze frame capability.

Figure 7A:
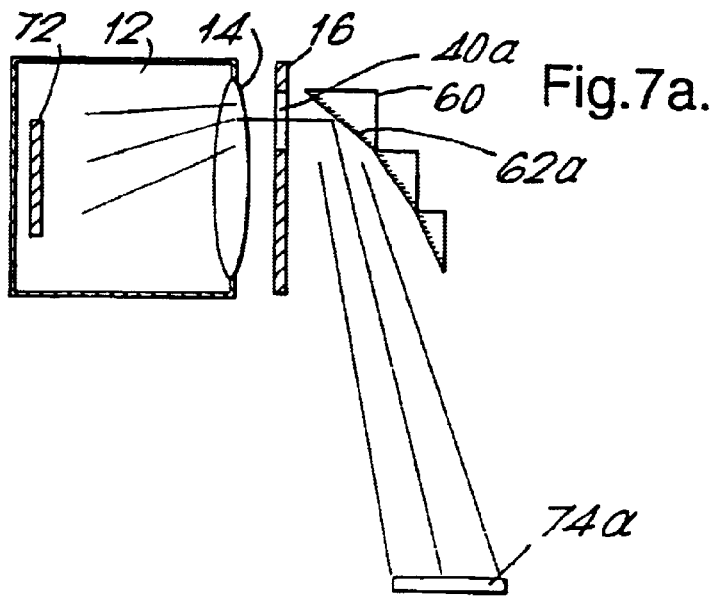
FIG. 7 is an illustration of the use of the system in accordance with the invention.
Figure 7B:
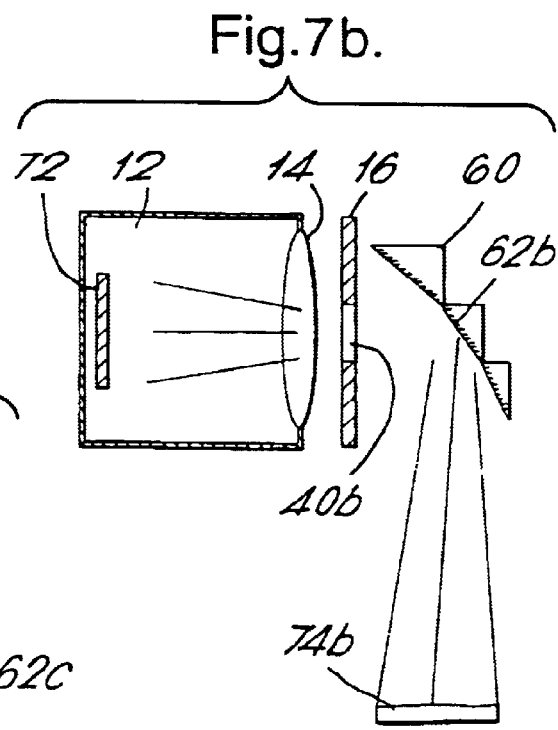
Figure 7C:
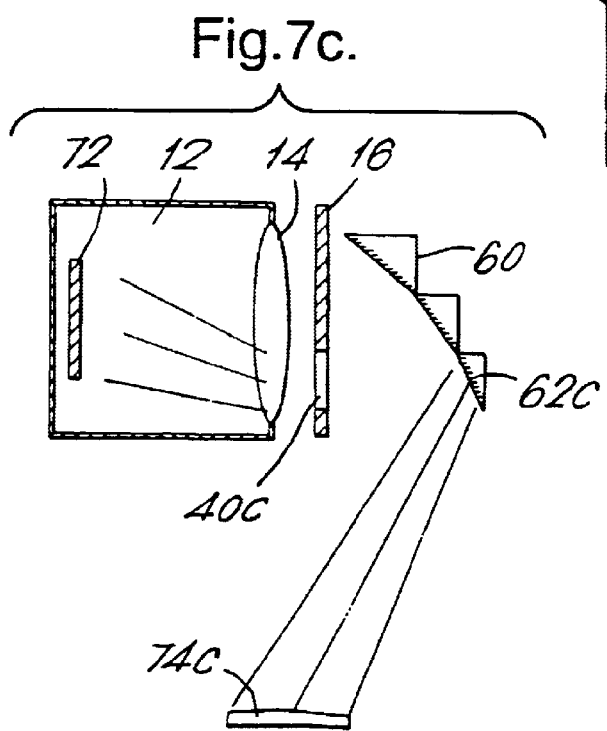

FIG. 7 is an illustration of the use of the system in accordance with the invention to provide a wider field of view than conventionally available, without sacrificing image resolution. FIG. 7 shows the camera 12 with lens 14, charge coupled device (CCD) 72, liquid crystal array 16, and optical device 60. In FIG. 7a, a first optical element 40a is in the transparent state, and the camera receives an image from a first field of view 74a, reflected off a first mirrored surface 62a of the optical device 60. In FIG. 7b, a second optical element 40b is in the transparent state, and the camera receives an image from a second field of view 74b reflected from a second mirrored surface 62b of the optical device 60. In FIG. 7c, a third optical element 40c is in the transparent state, and the camera receives an image from a third field of view 74c reflected from a third mirrored surface 62c of the optical device 60. It will be apparent that, in the previously illustrated embodiment, with nine mirrored surfaces, and an array of nine optical elements, there may be nine different fields of view. Of course, any convenient number of channels can be used.

When the first optical element 40a is in a transparent state, an optical channel from the field of view 74a via the first mirrored surface 62a and the first optical element 40a, through the lens 14 to the CCD 72 is formed. Similarly, when the second optical element 40b is transparent a second optical channel from the field of view 74b to the CCD 72 is formed, as is an optical channel from the third field of view 74c when the third optical element 40 is transparent.

In the absence of the optical device 60, the effect of the liquid crystal array 16 would be to act as a variable aperture control for the lens 14. Images transmitted to the CCD 72 through the different optical elements 40a, 40b, and 40c would be substantially identical. Increasing the number of transparent optical elements would increase the effective aperture of the lens 14. With the optical device 60 in place, the lens 14 acts as an integrator for the optical channels. The light ray lines shown in FIG. 7 are not intended to portray an accurate representation of the optical properties of the components but are a guide to the eye to indicate the general principles of operation of the system.

As described above, the system of the present invention can be used to provide nine separate images, each updated once every 360 ms, rather than a single image updated once every 40 ms. The images can be in directions which are overlapping, or adjacent, or widely separated, and the optical device 60 can readily be designed to achieve the required effect, or can be designed to be easily adjustable on site. It is also possible to insert a second mirror in some channels, so that some of the images are in opposite directions to one another. Such a system can then be used where any conventional CCTV camera is used, and is particularly advantageous where high resolution or a wide field of view is important, particularly, when the weight of the camera is a consideration.

One particular advantage is that, by comparison with a conventional system, in which a camera pans and tilts, to different positions, in this case there is no physical movement of the camera, and so images through a particular one of the channels always cover exactly the same area. This means that image processing, for example motion detection, is much simpler.

An illustration of the advantage of the present invention can be demonstrated with reference to an automatic number plate recognition system. In such a system, it is desired to obtain an image of a vehicle number plate, which has a width of approximately 600 mm, and which is at an unknown point on a road, which may for example have a width of 3600 mm. Using a conventional system, the six hundred or so horizontal image pixels must be used to obtain an image of the full road width, which means that approximately one hundred pixels are available to resolve the details of the number plate. This number can be insufficient, in particular if the number plate is dirty or damaged. However, using the system in accordance with this invention, different optical channels could be used to provide images of overlapping regions of the road width. For example, each of the regions may be 900 mm wide. With a total of nine overlapping images to choose from, it would be certain that one of the images would contain an image of the number plate occupying approximately two thirds of the total image. Thus, approximately four hundred of the six hundred or so horizontal pixels would be available to resolve the image.

Moreover, when the number plates are retroreflective, the image of the number plate will probably be by far the brightest object in the field of view. By appropriate image processing, it is then possible to open only the element of the liquid crystal array which contains the image of the number plate under software or hardware control.

One alternative use of the invention would be as part of an image processor such as a photocopier, facsimile machine, or scanner. The optical device, comprising a controllable shutter, and means for transmitting images of different parts of a document, could be positioned such that images are formed of a succession of patches covering a complete document. The partial images can then be combined by image processing software to form an image of the complete document, for storage, printing or transmittal as required.

The optical device described above has nine angled surfaces, which provide images of different fields of view. However, it will be appreciated that the same concept can be applied to any optical system. For example, the optical device can be configured to provide images of the same field of view, but focusing at different ranges. This would have the advantage over a mechanically driven optical system that the different optical configurations can be pre-set, and so it is possible to return to one of the configurations without any of the delay associated with moving mechanical parts. Moreover, a much greater depth of focus could be achievable.

Figure 8:
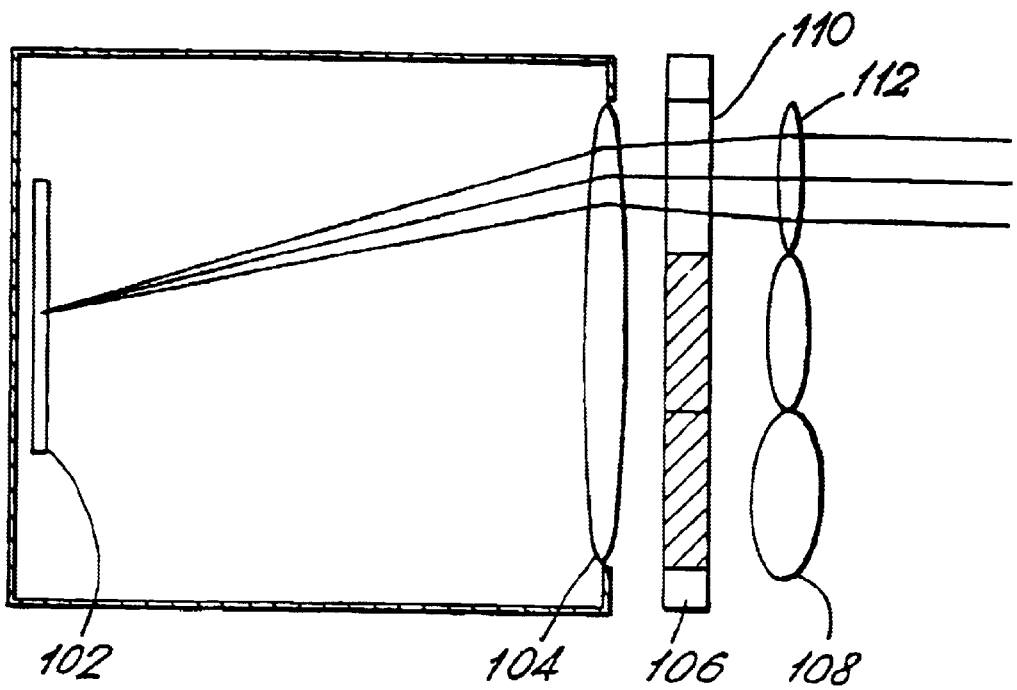
FIG. 8 is an illustration of an optical system in accordance with the invention for detecting images at differing focal ranges.

Referring to FIG. 8 there is shown an optical detection system 100 which provides for focusing at different ranges. The system 100 comprises an image detector 102, for example a CCD array and a lens 104 for focusing incident light onto the detector 102. A liquid crystal array spatial light modulator 106 is positioned adjacent the lens 104. A compound lens 108 is between a scene (not shown) and the SLM 106. The SLM 106 comprises a 9×9 array of liquid crystal elements, for example element 110. The compound lens 108 comprises a 9×9 array of lenslets, for example lenslet 112, each lenslet having a respective focal length. In operation, the individual elements of the SLM 106 are successively made transparent. As a result of the individual lenslet of the compound lens 108 in front of each SLM element having a differing focal length, the successive selection of SLM elements has the effect of providing successive images on the detector 102, with each image having a different focal range. The system 100 can therefore scan a scene in front of it at different focal ranges with no moving mechanical parts.

As an alternative to the use of a compound lens such as the lens 108, a variable focal range system could comprise a SLM behind a lens with an array of blocks of refractive material of differing thicknesses placed against the SLM or the lens.

A potential application for a system which automatically scans a field of view over a range of focal distances would be an automatic object recognition system where it is uncertain what the separation between the system and the object to be recognised would be.

Figure 9:
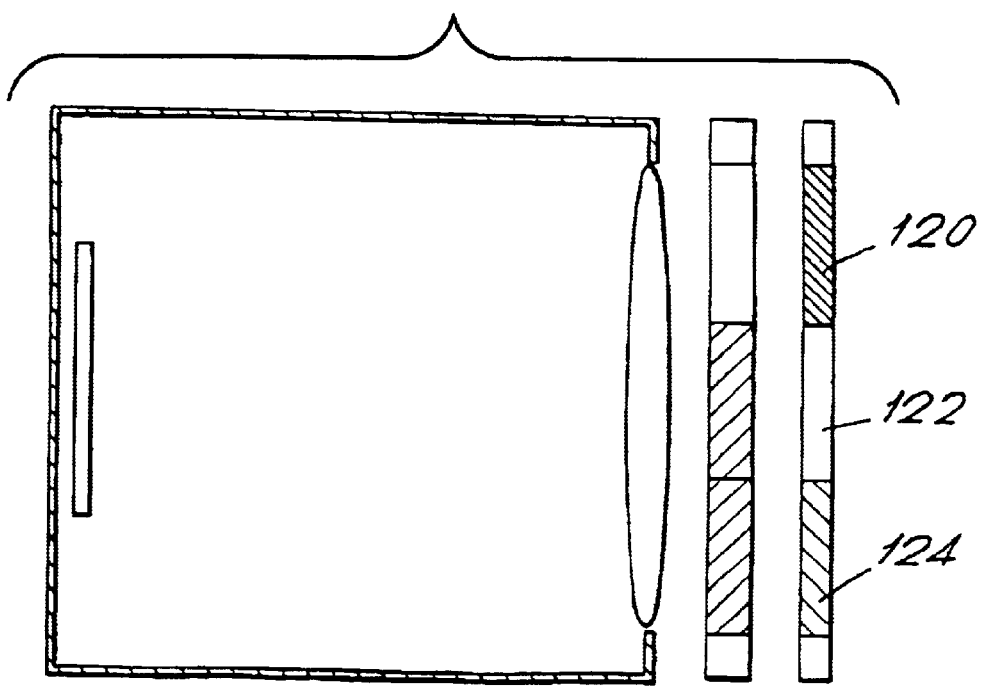
FIG. 9 is an illustration of an optical system in accordance with the invention having spectral sensitivity.

A further alternative is that the optical device can include spectral filters, as shown in FIG. 9, such that the different optical channels provide differently filtered images. For example, using red, green and blue filters 120, 122 and 124, it is possible to achieve a colour image, using a monochrome camera. By selecting infra-red (IR) filters, it is also possible to obtain a "colour" IR image, or to compare the total IR with the total visible image.

A further alternative is that the optical device may include a number of prisms, which are at different angles to one another, and thus provide differently rotated images in the different optical channels. This may be advantageous in situations where image processing is to be carried out, because in some situations it is much easier to process an image which is correctly rotated. Using an optical device of this type, it is possible to obtain a number of differently rotated images, and to select the image which is most easily processed.

What is claimed is:

1. An optical detection system for viewing a scene, said system comprising:
   (i) an image detector having an image detector area;
   (ii) a lens arrangement for focusing light from said scene onto said detector, said lens arrangement comprising a lens having a single optical axis; and
   (iii) an optical device, optically located between said scene and said lens arrangement, for acting upon light passing to said detector, said optical device comprising an array of optical elements each for acting upon light passing through a respective portion of said lens wherein said optical elements form a plurality of optical channels for the transmission of respective images to said detector through said lens; and wherein each image substantially fills the whole of the image detector area.

2. An optical detection system for viewing a scene, said system comprising:
   (i) an image detector having an image detector area;
   (ii) a lens arrangement for focusing light from said scene onto said detector, said lens arrangement comprising a lens having a single optical axis;
   (iii) an optical device, optically located between said scene and said lens arrangement, for acting upon light passing to said detector, said optical device comprising an array of optical elements each for acting upon light passing through a respective portion of said lens wherein said optical elements form a plurality of optical channels for the transmission of respective images to said detector through said lens; and wherein each image substantially fills the whole of the image detector area; and
   (iv) a selective shutter device for controlling the transmission of light to said detectors.

3. A system according to claim 2, wherein said selective shutter device controls the transmission of light through said channels to said detector.

4. The system of claim 2, said shutter device comprising an array of shutter elements and a controller for controlling said array of shutter elements, each of said shutter elements being selectively openable and closable in response to a respective control signal from said controller; and wherein said optical elements and said respective shutter elements in combination form a plurality of optical channels for the transmission of light to said detector through said lens; and wherein said shutter device provides means for selecting at least one of said optical channels for the transmission therethrough of an image to said detector.

5. A system according to claim 4, characterized in that said selective shutter device comprises a spatial light modulator.

6. A system according to claim 5, characterized in that said spatial light modulator comprises a liquid crystal spatial light modulator and wherein elements of said liquid crystal spatial light modulator are substantially transparent in an open state and substantially opaque in a closed state.

7. A system according to claim 4, characterized in that said spatial light modulator is positioned adjacent said lens.

8. A system according to claim 7, characterized in that said lens arrangement, spatial light modulator and optical device in combination provide selectable images to the detector from a plurality of directions.

9. A system according to claim 8, characterized in that said optical device comprises an array of reflective elements, each element having a respective inclination.

10. A system according to claim 7, characterized in that said lens arrangement, spatial light modulator and optical device, in combination, provide selectable images to said detector, said selectable images having differing ranges of focus.

11. A system according to claim 10, characterized in that said optical device comprises an array of lenslets, each lenslet having a respective focal length.

12. A system according to claim 10, characterized in that said optical device comprises an array of optically transmissive elements of differing thickness.

13. A system according to claim 7, characterized in that said lens arrangement, spatial light modulator and optical device in combination provide selectable images to said detector, said images having differing spectral frequency ranges.

14. A system according to claim 13, characterized in that said optical device comprises an array of spectral filters, each filter having a respective transmission bandwidth.

15. A surveillance system characterized in that said surveillance system comprises an optical detection system according to claim 4.

16. An optical detection system for viewing a scene, said system comprising:
   (i) an image detector having an image detector area;
   (ii) a lens arrangement for focusing light from said scene onto said detector, said lens arrangement comprising a lens having a single optical axis;
   (iii) an optical device, optically located between said scene and said lens, for acting upon light passing to said detector, said optical device comprising an array of optical elements each for acting upon light passing through a respective portion of said lens wherein said optical elements form a plurality of optical channels for the transmission of respective images having differing ranges of to said detector through said lens; and wherein each image substantially fills the whole of the image detector area; and
   (iv) a selective shutter device for controlling the transmission of light to said detector.

17. A system according to claim 16, wherein said optical device comprises an array of lenslets, each lenslet having a respective focal length.

18. A system according to claim 16, wherein said optical device comprises an array of optically transmissive elements of differing thickness.

19. A system according to claim 16, wherein said selective shutter device controls the transmission of light through said channels to said detector.

* * * * *